US012724720B2

(12) United States Patent
Halageri et al.

(10) Patent No.: US 12,724,720 B2
(45) Date of Patent: Sep. 1, 2026

(54) ADAPTIVE STEP DELAY IN PERIPHERAL TRIGGER GENERATOR

(71) Applicant: Microchip Technology Incorporated, Chandler, AZ (US)

(72) Inventors: Avinash Halageri, Bangalore (IN); Swathi G. Bhat, Bengaluru (IN)

(73) Assignee: Microchip Technology Incorporated, Chandler, AZ (US)

(*) Notice: Subject to any disclaimer, the term of this patent is extended or adjusted under 35 U.S.C. 154(b) by 21 days.

(21) Appl. No.: 18/940,531

(22) Filed: Nov. 7, 2024

(65) Prior Publication Data

US 2026/0127118 A1 May 7, 2026

(30) Foreign Application Priority Data

Nov. 1, 2024 (IN) ............................ 202411083757

(51) Int. Cl.
*G06F 13/10* (2006.01)
*G06F 13/24* (2006.01)

(52) U.S. Cl.
CPC ............ *G06F 13/105* (2013.01); *G06F 13/24* (2013.01)

(58) Field of Classification Search
None
See application file for complete search history.

(56) References Cited

U.S. PATENT DOCUMENTS 6,760,346 B1 * 7/2004 Suemura ............ H04Q 11/0005 370/504
12,425,013 B1 * 9/2025 Kress ....................... H03K 5/14
2009/0259445 A1 * 10/2009 Bedrosian ............... H04L 43/50 703/2
2014/0075052 A1 3/2014 Kris et al. ......................... 710/5
2019/0178995 A1 * 6/2019 Tsai ...................... G01S 7/4865

OTHER PUBLICATIONS

International Search Report and Written Opinion, Application No. PCT/US2025/021445, 12 pages, Jul. 18, 2025.
Microchip Technology Incorporated, "Peripheral Trigger Generator (PTG)," URL: https://developerhelp.microchip.com/xwiki/bin/view/products/mcu-mpu/16bit-mcu/peripherals/ptg/, 3 pages, Nov. 10, 2023

* cited by examiner

*Primary Examiner* — Henry Tsai
*Assistant Examiner* — Aurangzeb Hassan
(74) *Attorney, Agent, or Firm* — SLAYDEN GRUBERT BEARD PLLC

(57) ABSTRACT

A Peripheral Trigger Generator (PTG) for generating signals adaptively responsive to time-driven events based on execution run time. A variable PTG step delay, such as a "wait for software trigger" command, may provide an adaptive step delay between the output trigger commands. An adaptive step delay may use a combination of PTG Command+ Control Bit in PTG Special Function Register. The adaptive step delay may be part of the Functional Safety Diagnostics package developed for the PTG module.

21 Claims, 7 Drawing Sheets

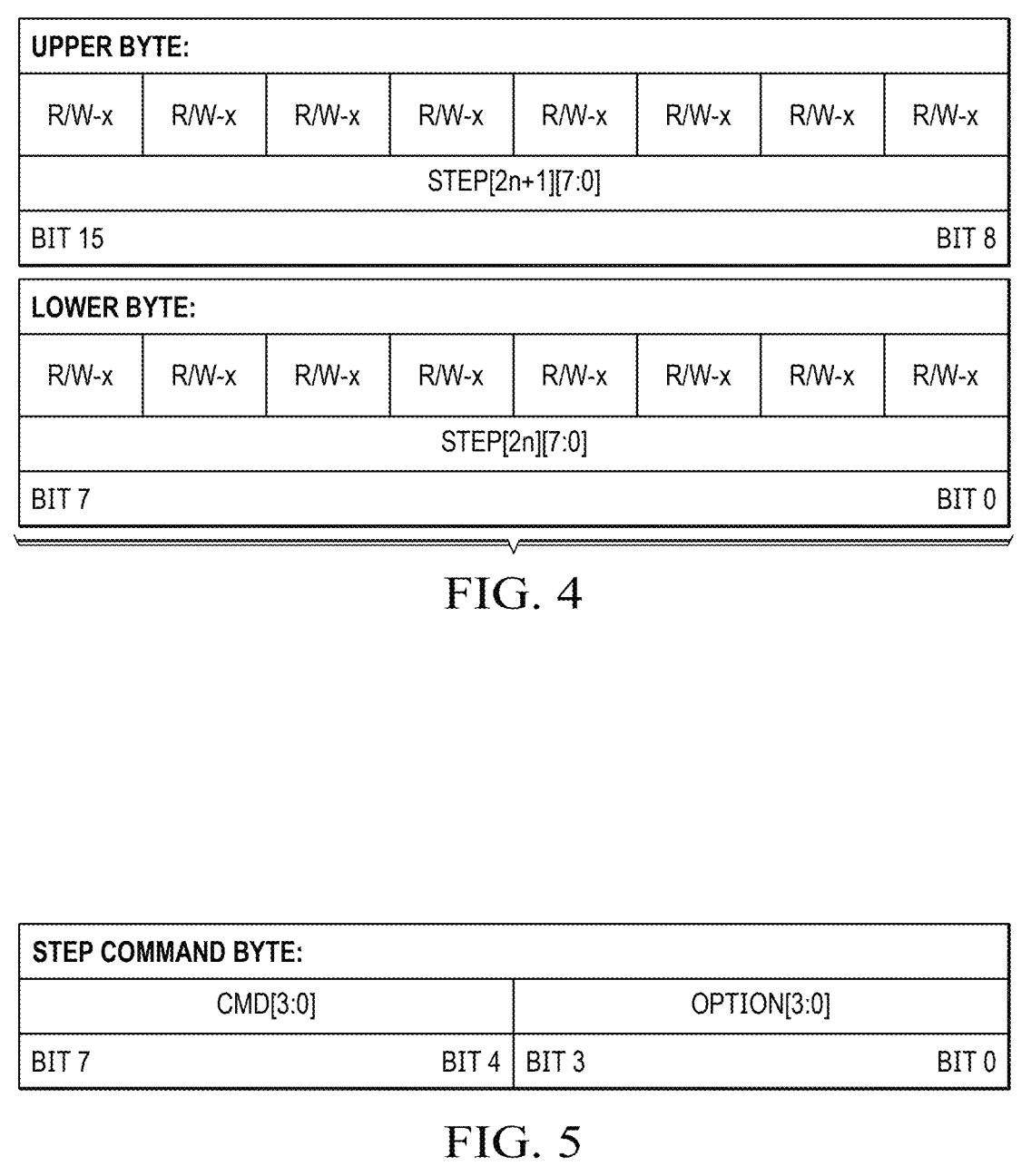

| UPPER BYTE: | | | | | | | |
|---|---|---|---|---|---|---|---|
| R/W-x | R/W-x | R/W-x | R/W-x | R/W-x | R/W-x | R/W-x | R/W-x |
| STEP[2n+1][7:0] | | | | | | | |
| BIT 15 | | | | | | | BIT 8 |

| LOWER BYTE: | | | | | | | |
|---|---|---|---|---|---|---|---|
| R/W-x | R/W-x | R/W-x | R/W-x | R/W-x | R/W-x | R/W-x | R/W-x |
| STEP[2n][7:0] | | | | | | | |
| BIT 7 | | | | | | | BIT 0 |

FIG. 4

| STEP COMMAND BYTE: | | | |
|---|---|---|---|
| CMD[3:0] | | OPTION[3:0] | |
| BIT 7 | BIT 4 | BIT 3 | BIT 0 |

FIG. 5

STEP COMMANDS IN PTGQUE

```
;   OUTER LOOP
STEP0:   PTGWHI      0x1      ;WAIT FOR POS EDGE TRIGGER #1
STEP1:   PTGCTRL     0xB      ;WAIT FOR SOFTWARE TRIGGER
STEP2:   PTGIRQ      0x1      ;GENERATE IRQ #1
;   INNER LOOP
STEP3:  PTGTRIG      0x03     ;GENERATE OUTPUT TRIGGER #3
STEP4:  PTGCTRL      0xB      ;WAIT FOR SOFTWARE TRIGGER
STEP5:  PTGJMPCO     0x03     ;JUMP TO STEP3 IF PTGCOI = PTGCOLIM, INCREMENT PTGCO
;   END INNER LOOP
STEP6: PTGJMPC1      0x00     ;JUMP TO STEP OIF PTGC1 = PTGC1LIM, INCREMENT PTGC1
;   END OUTER LOOP
STEP7: PTGIRQ        0x4      ;GENERATE IRQ #4
STEP8: PTGJMP        0x00     ;JUMP TO START OF QUEUE
```

FIG. 6B

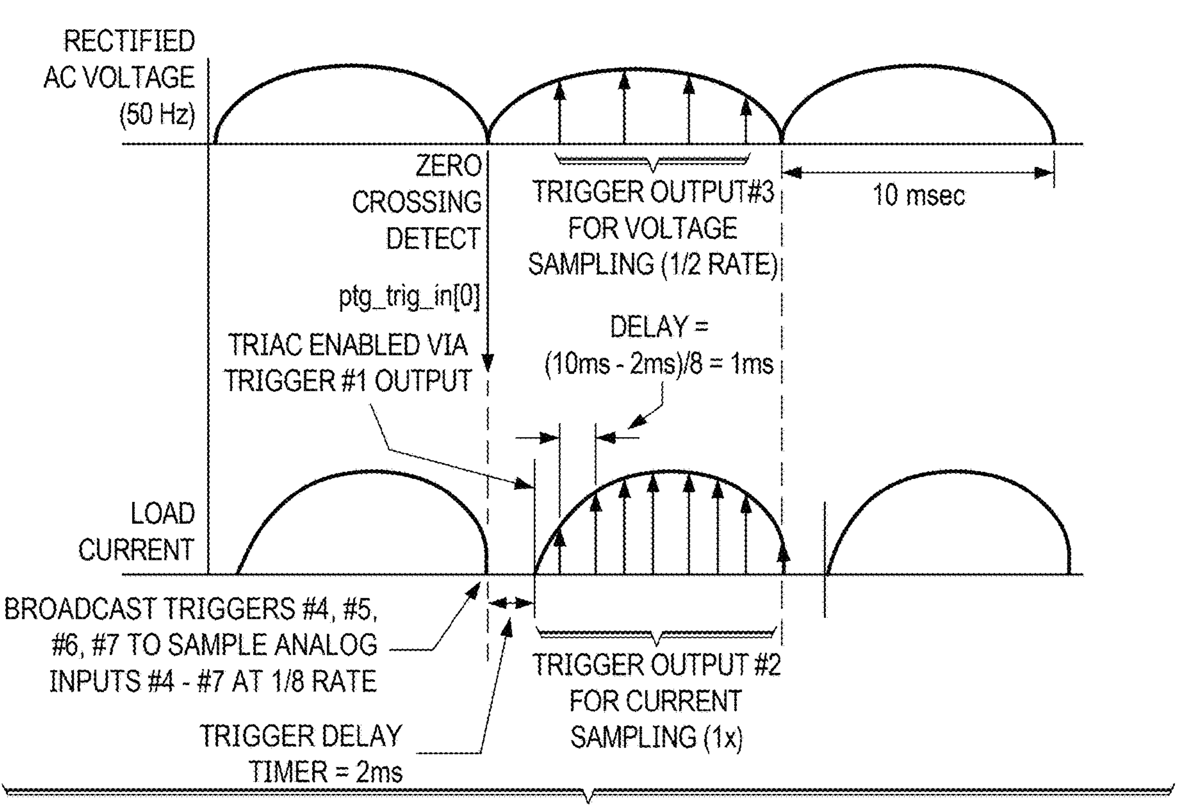

FIG. 7A

STEP COMMANDS IN PTGQUE

```
STEP0:   PTGWH     0x0    ;WAIT FOR POS EDGE TRIGGER #0
STEP1:   PTGCTRL   0xC    ;GENERATE OUTPUT TRIGGERS #76,54 (BROADCAST)
STEP2:   PTGCTRL   0xB    ;WAIT FOR SOFTWARE TRIGGER
STEP3:   PTGTRIG   0x01   ;GENERATE OUTPUT TRIGGER #1
; START MAIN LOOP
STEP4:   PTGCTRL   0xB    ;WAIT FOR SOFTWARE TRIGGER
STEP5:   PTGCTRL   0x02   ;GENERATE OUTPUT TRIGGER #2
STEP6:   PTGCTRL   0x03   ;GENERATE OUTPUT TRIGGER #3
STEP7:   PTGCTRL   0xB    ;WAIT FOR SOFTWARE TRIGGER
STEP8:   PTGCTRL   0x02   ;GENERATE OUTPUT TRIGGER #2
STEP9:   PTGJMPCO  0x04   ;JUMP TO STEP 4 IF PTGCOI = PTGCOLIM,
;  INCREMENT PTGCO
;  END MAIN LOOP
STEP10:  PTGJMP    0x00   ;JUMP TO START OF QUEUE
```

FIG. 7B

ADAPTIVE STEP DELAY IN PERIPHERAL TRIGGER GENERATOR

RELATED PATENT APPLICATION

This application claims priority to commonly owned Indian Patent Application number 202411083757 filed Nov. 1, 2024, the entire contents of which are hereby incorporated by reference for all purposes.

TECHNICAL FIELD

The present disclosure relates to a peripheral trigger generator, in particular, for use in a microcontroller.

BACKGROUND

Systems and methods can be provided to generate accurate and complex sequences of signals within a microcontroller to trigger, for example, an ADC (Analog Digital Converter) module to sample and convert analog signals in an application circuit. Using typical software methods is generally too imprecise and requires too much processor overhead. A peripheral trigger generator (PTG) allows, without CPU intervention, events that occur in a peripheral to (1) conditionally generate trigger(s) in another peripheral that vary in time and frequency; and (2) reconfigure the operation of another peripheral (e.g. ATD input channel select).

A Peripheral Trigger Generator (PTG) is user programmable via a PTG assembly language. The PTG may operate independently of the processor. The PTG can monitor selected peripheral signaling and generate signaling to other peripherals and/or the processor. The PTG can provide timing accuracy not possible if implemented in software. The PTG may operate faster than the CPU. Consequently, the PTG can monitor a number of inputs and generate complex timing sequences with a time accuracy not possible via software.

Synchronization between a CPU execution flow and PTG execution flow is achieved using a "PTG step delay." The PTG Step Delay is a precomputed delay and can be computed taking into account the execution time of one peripheral. "Run time computation" of the Step delay is not possible, so the same PTG Step delay is used before triggering the subsequent peripheral, which may be less or more than what is required for the subsequent peripheral. Other commands are available to change the PTG Step delay, i.e., provide a variable step delay, but those commands are precomputed and have limited capabilities. The PTG step delay can be computed only once. If multiple peripherals are triggered using the output trigger, the step delay can be computed in relation to execution time of only one peripheral. Variation in execution time of target peripherals causes a cascading effect and subsequent peripherals may miss triggers. There is a need for a Peripheral Trigger Generator (PTG) for generating signals adaptively responsive to time-driven events based on execution run time.

SUMMARY

Aspects provide a Peripheral Trigger Generator (PTG) for generating signals adaptively responsive to time-driven events based on execution run time. The PTG Step delay may be replaced with a "wait for software trigger" command to provide an adaptive step delay between the output trigger commands. A software algorithm may introduce an adaptive step delay in a PTG module. An adaptive step delay may use a combination of PTG Command+Control Bit in PTG Special Function Register. The adaptive step delay may be part of the Functional Safety Diagnostics package developed for the PTG module. The adaptive step delay may be used in diagnostics for PTG module in Automotive Domain applications.

Aspects provide a microcontroller comprising: a central processing unit (CPU); a plurality of peripheral units coupled with said CPU; and a peripheral trigger generator and operating independently from the CPU and being coupled with the plurality of peripheral units, wherein the peripheral trigger generator comprises a state machine which is programmable via said CPU by a plurality of sequential programming steps, wherein a variable step delay command is interleaved with at least one output trigger command, wherein the peripheral trigger generator is configured to receive a plurality of input signals and depending on a programming of the state machine selects at least one of said plurality of input signals and independent from the CPU controls a function of a selected one of said plurality of peripheral units depending on the selected input signal and the programming of the state machine, wherein the state machine generates at least one output signal to control the function of the selected peripheral unit.

An aspect provides a microcontroller as in the previous paragraph, wherein the state machine of the peripheral trigger generator comprises control logic receiving said selected input signal, a programmable step queue controlled by said control logic and comprising a plurality of registers storing said sequential programming steps and a command decoder coupled with the control logic and operable to receive the sequential programming steps and to generate the at least one output signal.

An aspect provides a microcontroller as in one of the previous two paragraphs, wherein the at least one output signal is a trigger signal that controls one of said peripheral units independently from said CPU.

An aspect provides a microcontroller as in one of the previous three paragraphs, wherein said one peripheral unit is an analog-to-digital converter. The peripheral unit may be any peripheral based on a microcontroller.

An aspect provides a microcontroller as in one of the previous four paragraphs, wherein the sequential programming steps allow for a coding that causes the peripheral trigger generator to wait for a variable step delay trigger condition of a selected input signal and to execute a following programming step said selected input signal meets the variable step delay trigger condition.

An aspect provides a microcontroller as in one of the previous five paragraphs, wherein the variable step delay trigger condition is a bit transition from 0 to 1.

An aspect provides a microcontroller as in one of the previous six paragraphs, wherein the sequential programming steps allow for a coding that causes the peripheral trigger generator before executing a following programming step to wait for a variable step delay trigger condition.

An aspect provides a microcontroller as in one of the previous seven paragraphs, wherein the variable step delay trigger is provided by setting a bit by the CPU in a control register of the peripheral trigger generator.

An aspect provides a microcontroller as in one of the previous eight paragraphs, wherein the sequential programming steps allow for a coding that generates an interrupt signal fed to said CPU.

An aspect provides a microcontroller as in one of the previous nine paragraphs, wherein the sequential programming steps allow for a coding that jumps to another programming step when a condition is fulfilled.

An aspect provides a microcontroller as in one of the previous ten paragraphs, wherein the sequential programming steps allow for a coding that generates said at least one output signal.

An aspect provides a microcontroller as in one of the previous eleven paragraphs, wherein the sequential programming steps allow for a coding that broadcasts a plurality of output signals.

An aspect provides a microcontroller as in one of the previous twelve paragraphs, wherein each programming step of the sequential programming steps comprises a command code and a parameter code.

An aspect provides a microcontroller as in one of the previous thirteen paragraphs, further comprising a watchdog timer wherein the watchdog timer is reset after completion of a programming step and a timeout of the watchdog timer stops execution of the sequential programming steps.

An aspect provides a microcontroller as in one of the previous fourteen paragraphs, wherein a timeout of the watchdog timer is programmable.

An aspect provides a microcontroller as in one of the previous fifteen paragraphs, wherein a timeout of the watchdog timer generates an interrupt fed to the CPU.

An aspect provides a microcontroller as in one of the previous sixteen paragraphs, wherein the peripheral trigger generator is configured to generate a plurality of output signals for a predefined number of peripheral units, wherein each output signal is generated upon execution of a programming step.

An aspect provides a microcontroller as in one of the previous seventeen paragraphs, wherein the peripheral trigger generator is configured to further generate a strobed output signal upon execution of a programming step, wherein the strobed output signal comprises a plurality of parallel output signals.

An aspect provides a microcontroller as in one of the previous eighteen paragraphs, wherein a value of the strobed output signal is provided by a parameter coded within the programming step.

An aspect provides a microcontroller as in one of the previous nineteen paragraphs, wherein the value has n bits and is extended to a bit width being greater than n.

An aspect provides a microcontroller as in one of the previous twenty paragraphs, wherein the strobed output signal is used to select a channel of an analog to digital converter.

BRIEF DESCRIPTION OF THE DRAWINGS

A more complete understanding of the disclosure and the advantages thereof may be acquired by referring to the following description, taken in conjunction with the accompanying drawings and wherein:

FIG. 4 illustrates exemplary control and status registers for a PTG.

FIG. 5 illustrates exemplary STEP queues.

FIG. 6A and FIG. 6B illustrate an example application using the PTG.

FIG. 7A and FIG. 7B illustrate an example application using the PTG.

Figure 1:
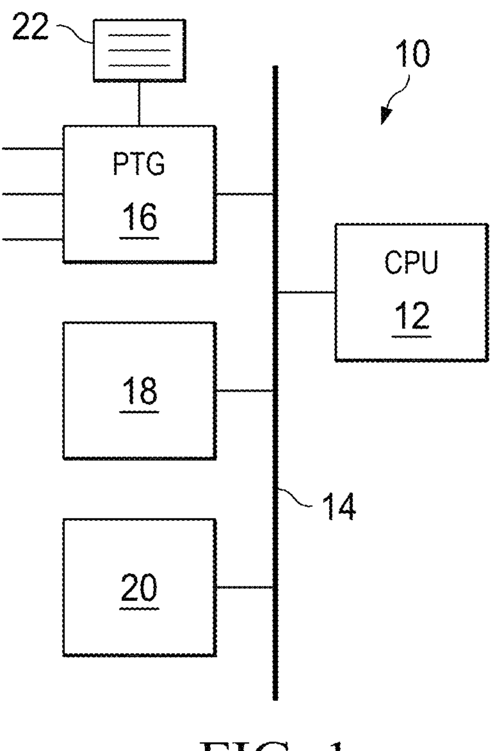
FIG. 1 is a block diagram of a microcontroller in accordance with embodiments of the invention.

The drawings accompanying and forming part of this specification are included to depict certain aspects of the disclosure. The reference number for any illustrated element that appears in multiple different figures has the same meaning across the multiple figures, and the mention or discussion herein of any illustrated element in the context of any particular figure also applies to each other figure, if any, in which that same illustrated element is shown. The features illustrated in the drawings are not necessarily drawn to scale. It should be noted that the features illustrated in the drawings are not necessarily drawn to scale.

DESCRIPTION

According to aspects, there is provided methods to introduce “variable step delay” without a PTG step delay command. A “variable step delay” may be adaptive for various triggered peripherals.

Turning now to FIG. 1, a diagram of an exemplary processor 10 employing a peripheral trigger generator. The processor 10 may be implemented as a microprocessor or microcontroller, or any suitable processing device. The processor 10 includes one or more central processing units 12 coupled via a bus 14 to one or more peripheral devices 18, 20. In addition, the processor 10 includes a peripheral trigger generator 16 for generating complex timing signals for both on-chip and off-chip peripherals. One or more control registers may be provided to control operation of the PTG 16. The peripheral devices can include ADCs, Input Capture, Output Compare, and Timers.

Figure 2:
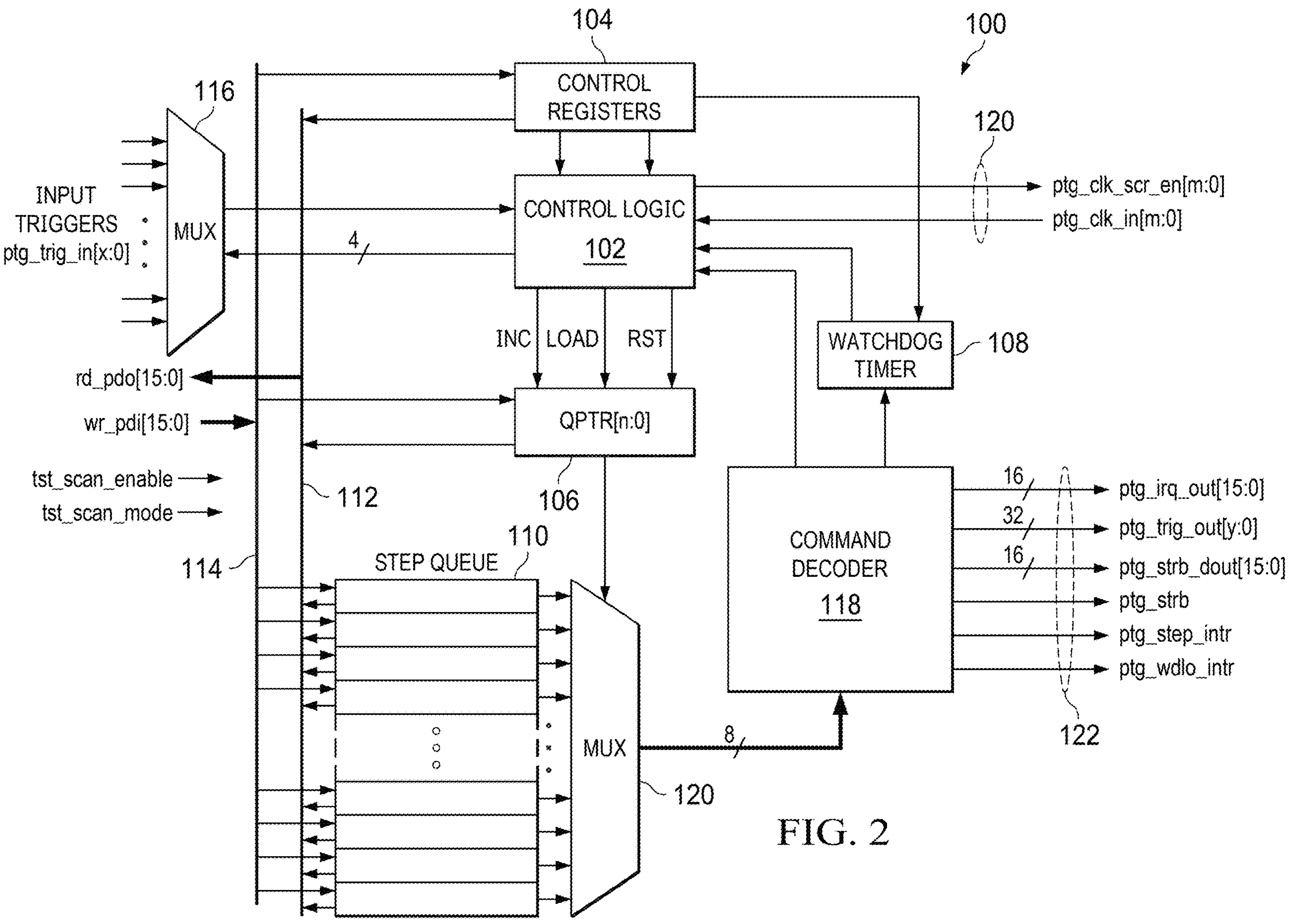
FIG. 2 is a block diagram of a peripheral trigger generator.

Turning now to FIG. 2, a diagram of an exemplary PTG is shown and generally identified by the reference numeral 100. The PTG 100 includes a STEP queue 110 coupled to a read bus 112 and a write bus 114. The STEP queue 110 is a small memory containing the instructions needed to implement the desired user functionality. A multiplexer 116 selects input signals that may be used to start or modify the program behavior in the STEP queue 110. The PTG 100 may receive inputs from external pins, analog comparators, pulse width modulator (PWM) time base comparators: Output Compare events: Input Capture events; and ADC (analog to digital conversion) complete signals. The PTG 100 further includes one or more control registers 104, control logic 102, a queue pointer (QPTR) 106, watchdog timer 108, and command decoder 118. The command decoder 118 converts executed STEP command into actions (signals) that can be connected to other modules (not shown) such as ADCs, Input Capture, Output Compare, Timers, or external device pins. According to a particular embodiment, the PTG 100 may comprise the following outputs: ADC trigger inputs; PWM sync inputs; Input Capture sync; Output compare clock input; Output compare sync input; and Analog comparator mask signal inputs.

Although any number of control and status registers may be used in conjunction with the PTG, wherein the control and status registers 104 are: PTG Control/Status register (PTGCST); PTG control register (PTGCON); PTG broadcast trigger enable (PTGBTE); PTG hold register (PTGHOLD): PTG GP timer 0 register (PTGT0LIM); PTG GP timer 1 register (PTGT1LIM); PTG step delay register (PTGSDLIM); PTG Loop Counter 0 (PTGCOLIM); PTG Loop Counter 1 (PTGC1LIM); PTG adjust register (PTGADJ); PTG Literal register (PTGL0); PTG queue pointer (PTGQPTR).

Figure 3:
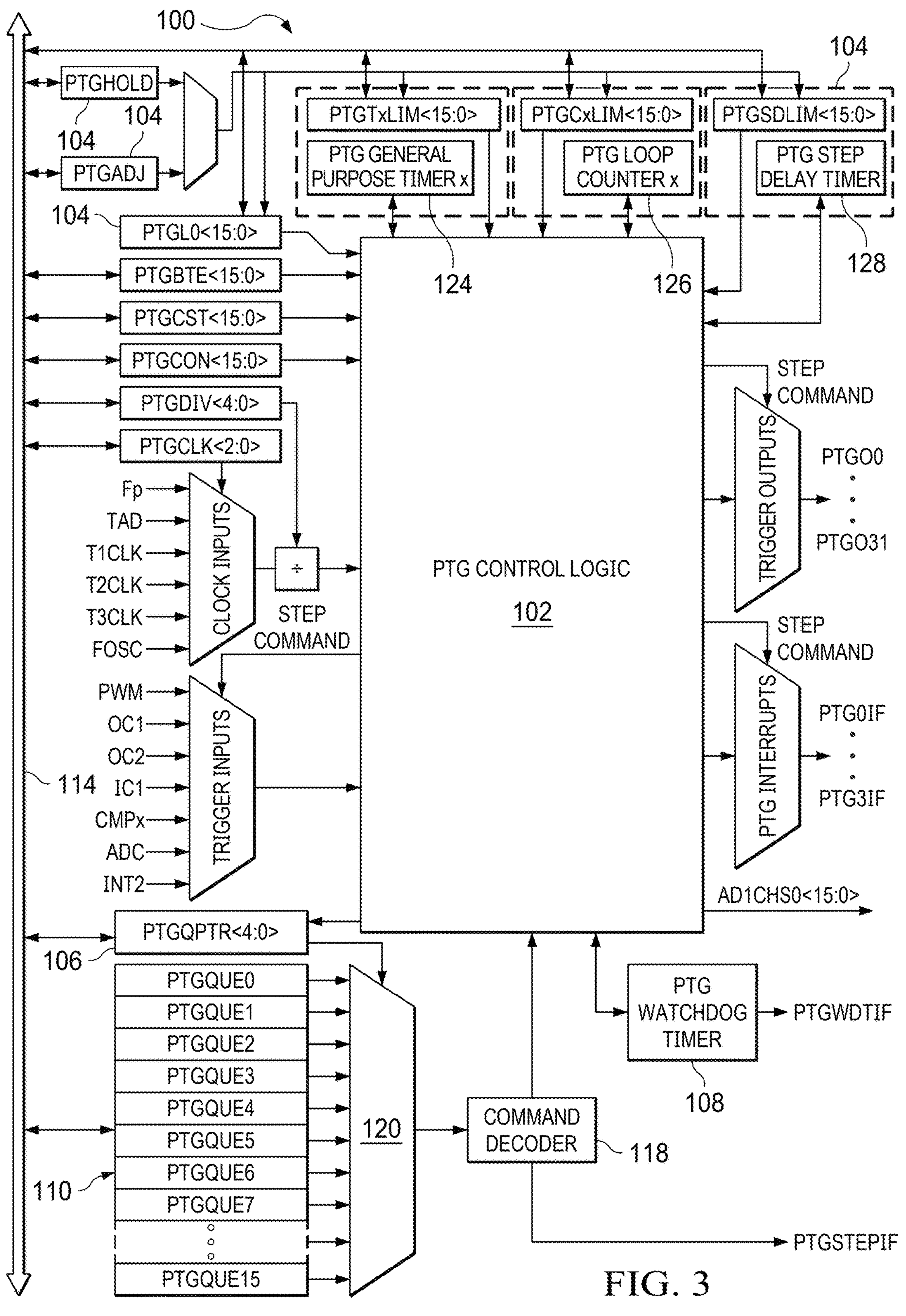
FIG. 3 is a block diagram of a peripheral trigger generator.

FIG. 3 is a block diagram of a peripheral trigger generator and shows greater detail of control and status registers. The PTG 100 includes one or more general purpose timers 124, one or more loop counters 126, and one or more delay timers 128.

FIG. 4 illustrates the structure and encoding of a step command. In operation, the user writes 8-bit commands called "Steps" into the PTG queue registers 110. Each 8-bit step is made up of a four bit command code and a four bit parameter field. The commands perform operations such as wait for an input trigger signal, generate an output trigger signal, and wait for the timer. More particularly, the commands define a sequence of events that generate trigger output signals 122 to peripherals such as the ADC, Output Compare, Input Capture, and the Timer macros. The STEP commands may also be used to generate interrupt requests to the processor.

STEP commands in the STEP queue 110 execute sequentially unless stopped by, e.g., a reset or by the Watchdog Timer (WDT) 108. In addition, the STEP commands can be made to wait on a command, such as an input trigger edge, a software trigger, or a timer match, before continuing. The STEP queue pointer register 106 is a special function register and an internal pointer. The pointer addresses the currently active step in the step queue 110. Each command byte is read, decoded, and executed sequentially.

While most instructions execute with predefined cycle count, the watchdog timer 108 is enabled during input trigger related step commands (all other commands execute and retire in two cycles). The WDT 108 is a free running, 9-bit counter that is reset when each step command retires (completes). During each PTG cycle, the WDT compares its value with a user selected timeout value, and will generate a WDT interrupt (ptg_wdto_intr), and halt step command execution should they ever match. The WDT 108 is intended to prevent PTG lock-up should an expected input trigger event never arrive.

The PTG module 100 can generate trigger, interrupt, and strobed data outputs by execution of specific Step commands. As noted above, the PTG module can generate up to thirty-two unique trigger output signals, in either an individual or broadcast mode. The PTG module can generate an individual output trigger on any one of the thirty-two trigger outputs. The individual trigger outputs are typically used to trigger individual ADC input conversion operations, but can be assigned to any function, including general purpose I/O ports. When the PTG module 100 is used with a compatible peripheral, such as the ADC module, the individual trigger output signals of the PTG 100 are individually assigned to specific analog input conversion controllers within the ADC module (not shown). The broadcast trigger output feature enables the user to simultaneously generate large number of (individual) trigger outputs with a single Step command.

In some embodiments, two 16-bit Loop Counters 126 are provided that may be used by the as a block loop counter or delay generator. All internal counters are cleared when the device is in the reset state or when the PTG module 100 is disabled. Step commands exist that can load, modify or initialize the Loop Counter limit values. Each Loop Counter includes an incrementing counter (PTGCn) and an SFR limit register (PTGCnLIM). The SFR value may be changed by a CPU write (when the module is disabled) or by the PTG sequencer (when the module is enabled). The stored value in the SFR that corresponds to each Loop Counter is referred to as the counter limit value.

The jump conditional command uses one of the Loop Counters to keep track of the number of times the command is executed, and may therefore be used to create code block loops. These are useful in applications where a sequence of peripheral events needs to be repeated several times. The jump command allows this to be achieved without requiring a large step queue to be implemented on the device.

Each time the jump command is executed, the corresponding internal Loop Counter is compared to its limit value. If the counter has not reached the limit value, the target jump queue location is loaded into the step Queue Pointer (PTGQPTR) 106, and the counter is incremented by 1. The next command will be fetched from the new queue location. If the counter has reached the limit value, the sequencer will proceed to the next command (i.e. increment the queue pointer) as usual. In preparation for the next jump command loop, the corresponding Loop Counter will also be cleared at this time. The provision for two separate Loop Counters and associated jump (PTGJMPCn) instructions allows for nested loops to be supported (one level deep). There are no restrictions with regards to which PTGJMPCn instruction resides in the inner or outer loops.

FIG. 5 illustrates exemplary STEP commands. Command may be encoded into two four-bit fields that make "hand assembly" of commands by a user a relatively simple task. An eight-bit step command may consist of a four-bit command field (CMD[3:0]) and a four-bit parameter field (OPTION[3:0]).

Commands may execute in a single cycle, except for flow change commands, and commands that are waiting for an external input. The sequencer is simply pipelined such that while a command is executing, the next command is being read from the step queue and decoded.

By default, a STEP command may execute in one PTG clock period. There are several techniques to slow the execution of the step commands:

Wait for a Trigger Input;

Wait for a GP Timer (PTGTnLIM);

Insert a delay loop using PTGJMPCn and PTGCn; and

Enable and (automatically) insert a Step Delay after execution of each command.

A variable step delay may be introduced without a PTG step delay command. The variable step delay command may be adaptive for various triggered peripherals.

The PTG 100 can support up to sixteen independent trigger inputs. The user may specify a step command that waits for a positive or negative edge, or a high or low level, of the selected input signal to occur. The operating mode is selected by a PTGITM [1:0] control field in the PTGCST register. The PTGWHI command looks for a positive edge or high state to occur on the selected trigger input. The PTGWLO command looks for a negative edge or low state to occur on the selected trigger input. PTG command sequencer will repeat the trigger input command (i.e. effectively wait) until the selected signal becomes valid before continuing step command execution. The minimum execution time of a "Wait for Trigger" command is one PTG clock. There is no limit to how long the PTG will wait for a trigger input (other than that enforced by the watchdog timer 108).

There may be four input trigger command operating modes supported that are selected by the PTGITM [1:0] control field in the PTGCST register. Note that if the Step Delay is disabled, modes 0 and 1 are equivalent in operation, and modes 2 and 3 are equivalent in operation.

Mode 0 is Continuous edge detect with Step Delay at exit. In this mode, the selected trigger input is continuously tested starting immediately when the PTGWHI or PTGWLO command is executed. When the trigger edge is detected, command execution completes. If the Step Delay counter 128 is enabled, the Step Delay will be inserted (once) after the valid edge is detected and the command execution has completed. If the Step Delay counter is not enabled, the command will complete after the valid edge is detected, and execution of the subsequent command will commence immediately.

Mode 1 is Continuous edge detect with no Step Delay at exit. In this mode, the selected trigger input is continuously tested starting immediately when the PTGWHI or PTGWLO command is executed. When the trigger edge is detected, command execution completes.

Whether the Step Delay counter 126 is enabled or not, the Step Delay may not be inserted after command execution has completed.

Mode 2 is Sampled level detect with Step Delay at exit. In this mode, the selected trigger input is sample tested for a valid level. Starting immediately when the PTGWHI or PTGWLO command is executed, and the trigger input is tested (once per PTG clock). If found not to be true and the Step Delay is enabled, the command waits for the Step Delay to expire before testing the trigger input again. When the trigger is found to be true, command execution completes and the Step Delay is inserted once more. If found not to be true and the Step Delay is disabled, the command immediately tests the trigger input again during the next PTG clock cycle. When the trigger is found to be true, command execution completes and execution of the subsequent command will commence immediately.

Mode 3 is Sampled level detect without Step Delay at exit. In this mode, the selected trigger input is sample tested for a valid level. Starting immediately when the PTGWHI or PTGWLO command is executed, and the trigger input is tested (once per PTG clock). If found not to be true and the Step Delay is enabled, the command waits for the Step Delay to expire before testing the trigger input again. When the trigger is found to be true, command execution completes and execution of the subsequent command will commence immediately. The Step Delay is not inserted. If found not to be true and the Step Delay is disabled, the command immediately tests the trigger input again during the next PTG clock cycle. When the trigger is found to be true, command execution completes and execution of the subsequent command will commence immediately.

The user may specify a step command to wait for a software generated trigger. The software generated trigger is generated by setting a bit in the PTGCST register. The PTGCTRL SWTRGE command is sensitive only to the 0 to 1 transition of the PTGSWT bit. This transition occurs during command execution, otherwise the command will continue to wait (with PTGSWT in either state). The PTGSWT bit is automatically cleared by hardware upon completion of the PTGCTRL SWTRGE command, initializing the bit for the next software trigger command iteration. The PTGCTRL SWTRGL command is sensitive to the level of the PTGSWT bit. The command will wait until it observes PTGSWT=1 at which time it will complete. It will complete immediately should PTGSWT=1 upon entry to the command. If desired, the PTGSWT bit may be cleared by the user upon completion of the PTGCTRL SWTRGL command.

The use of the PTGSWT bit in conjunction with a PTG step command that generates interrupt requests to the processor (PTGIRQ), allows the user to coordinate activity between the PTG module 100 and the application software.

There are two general purpose timers 124 (PTGT1, PTGT0) that may be used by the sequencer to wait for a specified period of time. All timers are cleared when the device is in the reset state or when the PTG module is disabled. Step commands exist that can load, modify or initialize the GP Timers. Each GP Timer 124 consists of an incrementing timer (PTGTn) and an SFR limit register (PTGTnLIM). The SFR value may be changed by a CPU write (when the module is disabled) or by the PTG sequencer (when the module is enabled). Data read from the SFR will depend upon the state of the Internal Visibility (PTGIVIS) bit.

When operating, the timers increment on the rising edge of the PTG clock (which is defined in the PTGCST register). The user can specify a wait operation using a GP timer by executing the appropriate PTGCTRL PTGTn command (wait for selected GP timer[n]).

The stored value in the SFR that corresponds to each GP Timer 124 is referred to as the timer limit value. The wait step command is stalled in state S1x until such time that the timer reaches its limit value, at which point the command will complete and the next command will start. The timer is also cleared at this time in preparation for its next use.

The Step Delay Timer (SDLY) 128 makes each step command take a specified amount of time. A user may specify a step delay equal to the duration of a peripheral function, such as the ADC conversion time. The step delay enables the user to generate trigger output signals at a controlled rate so as not to overload the target peripheral.

The PTGSDLIM register defines the additional duration of each step command in units of PTG clocks. The Step Delay Timer is disabled by default. The user can enable and disable the Step Delay Timer via the PTGCTRL SDON or PTGCTRL SDOFF commands that may be placed into the step queue.

When operating, the Step Delay Timer will increment at the PTG clock rate defined in the PTGCST register. The stored value in the PTGSDLIM SFR is referred to as the timer limit value. The Step Delay is inserted after each command is executed such that all step commands (using the Step Delay) are stalled until the PTGSD timer reaches its limit value, at which point the command will complete and the next command will start. The timer is also cleared during execution of each command, such that it is ready for the next command.

The PTG step delay may be replaced by a variable step delay command, such as a PTG wait for software trigger. According to the wait for software trigger step delay command, the PTG waits for the software trigger (PTGSWT bit transition from “0” to “1”). Once the peripheral has executed a step, the PTGSWT bit is set to “1”, which provides the “software trigger” for a next step. Output triggers wait for confirmation from triggered peripheral before executing next command. The edge sensitive “PTG software trigger” command have an additional hardware, external to the PTG sequencer, to recognize the appropriate edge transition. There is no dependency on the PTG sequencer to detect the edge transition. No matter the number of output triggers, the mechanism remains the same. “Wait for software trigger” commands may be interleaved with the output trigger commands.

As noted above, the PTG module 100 can generate trigger, interrupt and strobed data outputs through the execution of specific step commands.

In some embodiments, the PTG 100 can generate a total of (up to) thirty-two unique output trigger signals as Individual or Broadcast outputs. The module can generate an individual trigger on any one of thirty-two trigger outputs using the PTGTRIG command. The individual output triggers are typically used to trigger individual ADC input conversion operations, but may be assigned (in the top-level device DOS) to any function, including GP I/O ports. When the PTG module is used with a compatible peripheral, the individual trigger output signals of the PTG 100 are individually assigned to specific analog input conversion controllers within the ADC module.

The broadcast output trigger capability is specified by the PTGBTE register. A bit in the PTGBTE register may correspond to an associated individual trigger output on the low order half of the trigger bus (ptg_trig_out [(PTG_NUM_TRIG_OUT−1):0]). If a bit is set in the PTGBTE register and a broadcast trigger step command (PTGCTRL BTRIG) is executed, the corresponding individual trigger output is asserted. The trigger broadcast capability enables the user to simultaneously generate large numbers of trigger outputs with a single step command.

The PTG module 100 can generate a total of up to sixteen unique interrupt request signals. The interrupt request signals are useful for interacting with the application software to create more complex functions. The module can generate an individual IRQ pulse on the IRQ bus using the PTGIRQ step command.

The PTG 100 supports a strobed data port that accepts data from several sources from within the module. A typical implementation would connect the strobe bus to an ADC channel select input port, connecting as many strobe bus bits as there are channels. The PTG command sequence could then directly select which ADC channel to convert.

The PTGSTRB command zero extends the LS 5-bits of command to 16-bits, then outputs the 16-bit value onto the ptg_strb_dout[15:0] data bus together with a strobe signal. The literal data is embedded within the command, so each PTGSTRB command instance may contain a different literal value.

The PTGCTRL STRBL0 command will write the contents of the PTGL0 register onto the ptg_strb_dout[15:0] data bus together with a strobe signal. The PTGL0 register may be modified using the PTGADD and PTGCOPY commands. The PTGCTRL STRBC0 command will write the contents of the PTGC0 loop counter register onto the ptg_strb_dout[15:0] data bus together with a strobe signal. The PTGCTRL STRBC1 command will write the contents of the PTGC1 loop counter register onto the ptg_strb_dout [15:0] data bus together with a strobe signal.

All trigger, IRQ and Data Strobe outputs are internally asserted by the PTG state machine 102 when the corresponding step command starts (i.e. before any additional time specified by the Step Delay Timer) on the rising edge of the PTG execution clock. When operating in pulsed mode (PTGTOGL=0), the width of the trigger output signals is determined by the PTGPWD [3:0] bit field in the PTGCON register, and may be any value between one and sixteen PTG clock cycles. The default value is one PTG clock cycle. When globally controlled by the PTGCTRL BTRIG broadcast trigger command, the TRIG output pulse width is determined by a PTGPWD [3:0] bit field in the PTGCON register, and may be any value between one and sixteen PTG clock cycles. The default value is one PTG clock cycle.

The strobe data outputs are asserted by the PTG state machine at the beginning of the first PTG execution clock of the corresponding data strobe step command before any additional time specified by the Step Delay Timer. The strobe clock signal (ptg_strb) is initiated by the state machine at the same time.

Figure 6A:
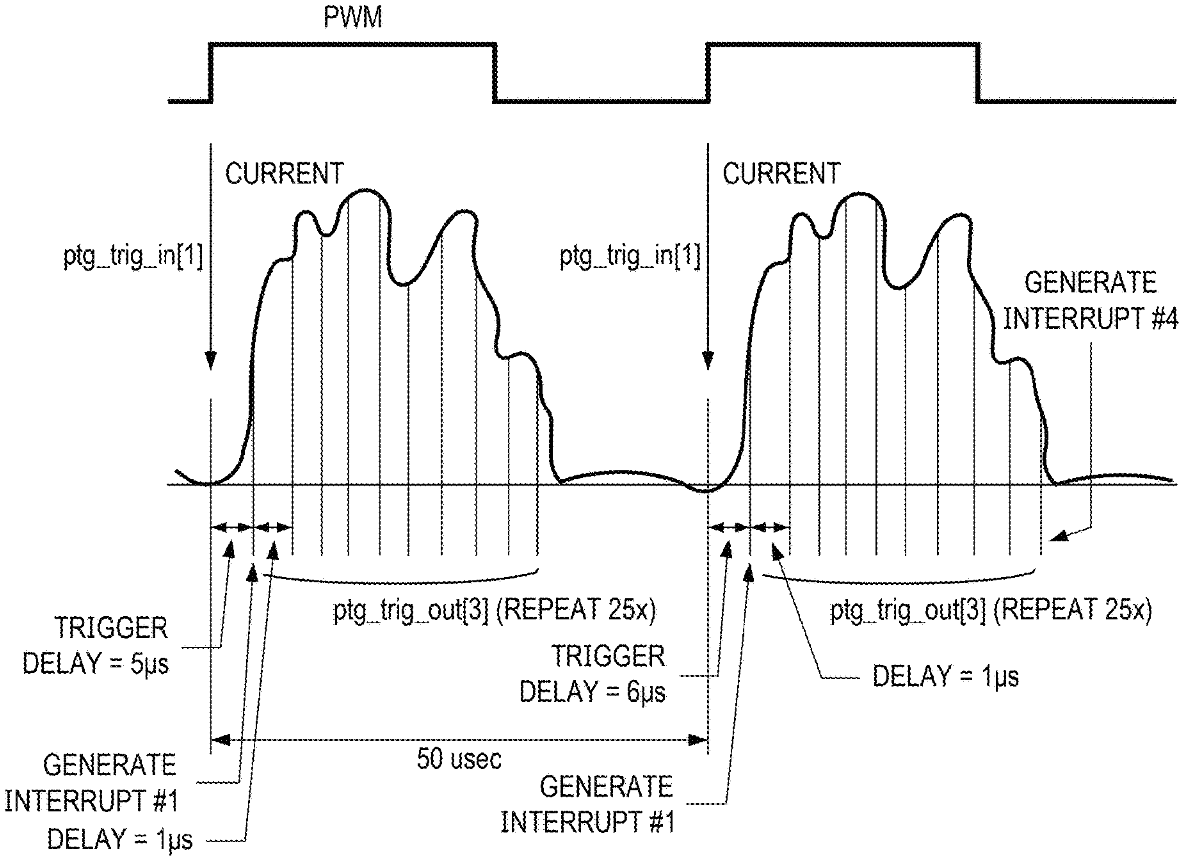

FIG. 6A shows an application to accurately measure the power in a system where the current load is highly dependent on temperature, voltage, and end consumer application. The current waveforms vary widely per customer usage, but over a few pulse width modulation (pwm) cycles, the waveform is relatively stable. The goal is to take many current and/or voltage readings over several pwm cycles in an interleaved manner. The data is stored in the device system memory during acquisition and is later post processed (integrated) to yield an accurate power value. This example shows a situation where it would not be practical or possible for software to accurately schedule the ADC samples.

FIG. 6B shows exemplary STEP programming for the timing sequence of FIG. 6A. In the program illustrated, the following assumptions are made:

1. Trigger input #1 is connected to the PWM signal. This rising edge of the PWM signal starts the sequence.
2. Output trigger #3 is connected to the ADC. This signal commands the ADC to begin a sample and conversion process.
3. Interrupt #1 is used to signal the processor that a sub sequence has started, (provides status)
4. Interrupt #4 is used to signal the processor that the complete sequence has completed.
5. The ADC clock is selected as the PTG clock source.
6. The ADC clock is 14 MHz.
7. The initial trigger delay is 5 μs.
8. The 2nd trigger delay is 6 μs.
9. In each PWM cycle, the ADC will be triggered 25 times.
10. The basic sequence is run twice.

Initialize the following control registers:

$$PTGT0\text{LIM} = 70_{10}(5\ \mu s \times 14\ clks/\mu s)$$

$$PTGT1\text{LIM} = 11_{10}[1\ \mu s \times 14\ clks/\mu s] - 3\text{ step clocks})$$

$$PTGC0\text{LIM} = 24_{10}[\text{total of 25 inner loop iterations})$$

$$PTGC1\text{LIM} = 1\ (\text{total of 2 outer loop iterations})$$

$$PTGHOLD = 70_{10}(5\ \mu s \times 14\ clks/\mu s)$$

$$PTGADJ = 14_{10}(1\ \mu s \times 14\ clks/\mu s)$$

$$PTGSD\text{LIM} = 0\ (\text{no step delay})$$

$$PTGBTE = 0 \times 0000\ (\text{no broadcast triggers})$$

$$PTGQPTR = 0\ (\text{start of step queue})$$

$$PTGCST = 0 \times 8200\ (\text{after } PTGQPTR \text{ is initialized})$$

As shown in FIG. 6B, the PTG step delay is not used, but instead it is replaced by a variable step delay command, such as a PTG wait for software trigger. Sequence of Events as follows:

STEP 0 Wait for positive edge of trigger number 1.

STEP 1 "Wait for software trigger" step command-PTG is now waiting for the software trigger (PTGSWT bit transition from '0' to '1'). In the ISR that handles the ADC input conversion, the PTGSWT bit is set to 1 which provides the "software trigger" for STEP 1.

STEP 2 Generate the IRQ #1. The module can generate an individual IRQ pulse on the IRQ bus using the PTGIRQ step command.

STEP 3 Generates the output trigger number 3 for the PPS output.

STEP 4 "Wait for software trigger" step command-PTG is now waiting for the software trigger (PTGSWT bit transition from '0' to '1'). Once the CPU handles the "change notification" triggered by PTG output, the PTGSWT bit is set to 1, which provides the software trigger for STEP 4.

STEP 5 Jump to Step 3, IF PTGOI.

STEP 6 Jump to Step 0, IF PTGC1.

STEP 7 Generate the IRQ #4. The module can generate an individual IRQ pulse on the IRQ bus using the PTGIRQ step command.

STEP 8 Jump to start of queue.

FIG. 7A shows an example where the goal is to sample one ADC input at a fast rate (1× rate), a second analog input at a slower rate (one-half rate), and analog inputs #3-#7 at a one-eighth rate. The example is a motor control application using an SCR (Silicon Controlled Rectifier) which triggers at a specified time after the AC line zero crossing. While this example uses simple binary sampling ratios, the PTG can generate a very wide range of sample ratios to meet the requirements of an application.

FIG. 7B shows exemplary STEP programming for the timing sequence of FIG. 7A. In the program illustrated, the following assumptions are made:

1. Trigger input #0 is connected to the zero crossing detect. This rising edge of the zero crossing detect signal starts the sequence.
2. The trigger delay from trigger in #0 to the generation of trigger #1 output is 2 ms.
3. Trigger output #1 enables the SCR in the application circuit.
4. Trigger output #2 is connected to the ADC to trigger sampling of the current measurement at 1 ms intervals.
5. Trigger output #3 is connected to the ADC to trigger sampling of the supply voltage measurement at 2 ms intervals.
6. Trigger outputs #4, #5, #6, and #7 are connected to the ADC to sample other data values once per cycle.
7. The ADC clock is selected as the PTG clock source.
8. The ADC clock is 14 MHz.

Initialize the following control registers:

$$PTGT0LIM = 28000_{10}(2\ \text{ms} \times 14\ clks/\mu\text{s})$$

$$PTGT1LIM = 14000_{10}(1\ \text{ms} \times 14\ clks/\mu\text{s})$$

$$PTGC0LIM = 24_{10}(\text{total of 25 inner loop iterations})$$

$$PTGC1LIM = 1\ (\text{total of 2 outer loop iterations})$$

$$PTGHOLD = 0\ (\text{not used})$$

$$PTGADJ = 0\ (\text{not used})$$

-continued $$PTGSDLIM = 0\ (\text{no step delay})$$

$$PTGBTE = 0 \times 00F0\ (\text{enable broadcast triggers 4–7})$$

$$PTGQPTR = 0\ (\text{start of step queue})$$

$$PTGCST = 0 \times 8200\ (\text{after } PTGQPTR \text{ is initialized})$$

As shown in FIG. 7B, the PTG step delay is not used, but instead it is replaced by a variable step delay command, such as a PTG wait for software trigger. Sequence of Events as follows:

STEP 0 Wait for positive edge of trigger number 0.

STEP 1 Generates the output trigger numbers 76 and 54 for the PPS output broadcast.

STEP 2 "Wait for software trigger" step command-PTG is now waiting for the software trigger (PTGSWT bit transition from '0' to '1'). In the ISR that handles the ADC input conversion, the PTGSWT bit is set to 1 which provides the "software trigger" for STEP 2.

STEP 3 Generate the output trigger number 1 for the PPS output.

STEP 4 "Wait for software trigger" step command-PTG is now waiting for the software trigger (PTGSWT bit transition from '0' to '1'). Once the CPU handles the "change notification" triggered by PTG output, the PTGSWT bit is set to 1, which provides the software trigger for STEP 4.

STEP 5 Generate the output trigger number 2 for the PPS output.

STEP 6 Generate the output trigger number 3 for the PPS output.

STEP 7 "Wait for software trigger" step command-PTG is now waiting for the software trigger (PTGSWT bit transition from '0' to '1'). Once the CPU handles the "change notification" triggered by PTG output, the PTGSWT bit is set to 1, which provides the software trigger for STEP 7.

STEP 8 Generate the output trigger number 2 for the PPS output.

STEP 9 Jump to step 4, IF PTGOI=PTGCOLIM.

STEP 10 Jump to start of queue.

The execution time may be faster using variable step delay commands, such as wait for software trigger commands, rather than step delay commands. According to a test example not related to the command sequence of FIGS. 6B and 7B, the time to process a sequence using a step delay is 2.4 microseconds, compared to the time to process the same sequence using a variable step delay command, such as a wait for software trigger, is 0.9 microseconds.

| Sequence (with PTG Step Delay | Time (µsec) | Sequence (With Wait for Software Triger) | Time (µsec) |
|---|---|---|---|
| Step 0: Trigger ADC conversion | 0.1 | Step 0: Trigger ADC conversion | 0.1 |
| Step 1: Step Delay | 1.0 | Step 1: Wait for Software trigger | 0.2 |
| Step 2: Trigger PPS conversion | 0.2 | Step 2: Trigger PPS conversion | 0.1 |
| Step 3: Step Delay | 1.0 | Step 3: Wait for Software Trigger | 0.3 |
| Step 4: Trigger ADC conversion | 0.1 | Step 4: Trigger ADC conversion | 0.1 |
| TOTAL TIME | 2.4 | TOTAL TIME | 0.9 |

Although examples have been described above, other variations and examples may be made from this disclosure without departing from the spirit and scope of these disclosed examples.

What is claimed is:

1. A microcontroller comprising:

a central processing unit (CPU);

a plurality of peripheral units coupled with said CPU; and a peripheral trigger generator operating independently from the CPU and being coupled with the plurality of peripheral units, wherein the peripheral trigger generator comprises a state machine which is programmable via said CPU by a plurality of sequential programming steps, wherein a variable step delay command is interleaved with at least one output trigger command, wherein the peripheral trigger generator is configured to:

receive a plurality of input signals, depending on a programming of the state machine, select at least one of said plurality of input signals, and independent from the CPU, control a function of a selected one of said plurality of peripheral units depending on the selected input signal and the programming of the state machine, wherein the state machine generates at least one output signal to control the function of the selected peripheral unit.

2. The microcontroller according to claim 1, wherein the state machine of the peripheral trigger generator comprises control logic receiving said selected input signal, a programmable step queue controlled by said control logic and comprising a plurality of registers storing said sequential programming steps and a command decoder coupled with the control logic and operable to receive the sequential programming steps and to generate the at least one output signal.

3. The microcontroller according to claim 1, wherein the at least one output signal is a trigger signal that controls one of said peripheral units independently from said CPU.

4. The microcontroller according to claim 3, wherein said one peripheral unit is an analog-to-digital converter.

5. The microcontroller according to claim 1, wherein the sequential programming steps allow for a coding that causes the peripheral trigger generator to wait for a variable step delay trigger condition of a selected input signal and to execute a following programming step said selected input signal meets the variable step delay trigger condition.

6. The microcontroller according to claim 5, wherein the variable step delay trigger condition is a bit transition from 0 to 1.

7. The microcontroller according to claim 1, wherein the sequential programming steps allow for a coding that causes the peripheral trigger generator before executing a following programming step to wait for a variable step delay trigger condition.

8. The microcontroller according to claim 7, wherein the variable step delay trigger condition is provided by setting a bit by the CPU in a control register of the peripheral trigger generator.

9. The microcontroller according to claim 1, wherein the sequential programming steps allow for a coding that generates an interrupt signal fed to said CPU.

10. The microcontroller according to claim 1, wherein the sequential programming steps allow for a coding that jumps to another programming step when a condition is fulfilled.

11. The microcontroller according to claim 1, wherein the sequential programming steps allow for a coding that generates said at least one output signal.

12. The microcontroller according to claim 1, wherein the sequential programming steps allow for a coding that broadcasts a plurality of output signals.

13. The microcontroller according to claim 1, wherein each programming step of the sequential programming steps comprises a command code and a parameter code.

14. The microcontroller according to claim 1, further comprising a watchdog timer wherein the watchdog timer is reset after completion of a programming step and a timeout of the watchdog timer stops execution of the sequential programming steps.

15. The microcontroller according to claim 14, wherein a timeout of the watchdog timer is programmable.

16. The microcontroller according to claim 14, wherein a timeout of the watchdog timer generates an interrupt fed to the CPU.

17. The microcontroller according to claim 1, wherein the peripheral trigger generator is configured to generate a plurality of output signals for a predefined number of peripheral units, wherein each output signal is generated upon execution of a programming step.

18. The microcontroller according to claim 1, wherein the peripheral trigger generator is configured to further generate a strobed output signal upon execution of a programming step, wherein the strobed output signal comprises a plurality of parallel output signals.

19. The microcontroller according to claim 18, wherein a value of the strobed output signal is provided by a parameter coded within the programming step.

20. The microcontroller according to claim 19, wherein the value has n bits and is extended to a bit width being greater than n.

21. The microcontroller according to claim 19, wherein the strobed output signal is used to select a channel of an analog to digital converter.

* * * * *